March 7, 1967   R. LUKSO ETAL   3,308,377
VARIABLE GAIN DISPLAY DEVICE HAVING INDICATOR MEANS AND
SCALE MEANS RESPONSIVE TO FIRST AND SECOND
VARIABLE PARAMETERS RESPECTIVELY
Filed April 27, 1962   2 Sheets-Sheet 1

INVENTORS
ALAN B. RANFORD
RICHARD LUKSO
WILLIAM ELKINS

March 7, 1967 R. LUKSO ET AL 3,308,377
VARIABLE GAIN DISPLAY DEVICE HAVING INDICATOR MEANS AND
SCALE MEANS RESPONSIVE TO FIRST AND SECOND
VARIABLE PARAMETERS RESPECTIVELY
Filed April 27, 1962 2 Sheets-Sheet 2

INVENTORS
ALAN B. RANFORD
RICHARD LUKSO
WILLIAM ELKINS

United States Patent Office 3,308,377
Patented Mar. 7, 1967

3,308,377
VARIABLE GAIN DISPLAY DEVICE HAVING INDICATOR MEANS AND SCALE MEANS RESPONSIVE TO FIRST AND SECOND VARIABLE PARAMETERS RESPECTIVELY
Richard Lukso and Alan B. Ranford, Grand Rapids, Mich., and William Elkins, Canoga Park, Calif., assignors, by mesne assignments, to Lear Siegler, Inc., Santa Monica, Calif., a corporation of Delaware
Filed Apr. 27, 1962, Ser. No. 190,596
1 Claim. (Cl. 324—115)

This invention relates to instrumentation and display apparatus, and more particularly to a display having an expandable scale. It relates especially to a compact variable gain display capable of providing both accurate value indications at specific portions of the scale, and also a large scale range capable of covering different phases of an operation.

Technological advances in vehicles such as aircraft, space vehicles, submarines and the like, enabling highly versatile operational characteristics, have caused presently available display apparatus of these performance characteristics to be inadequate. A conventional display device is inadequate to indicate accurate values at each place over the complete scale range, and yet provide a large scale range in a compact space. Accuracy or quality, and scale range are normally inconsistent factors. Examples of this are: (1) the inability to accurately indicate speed of space vehicles at all values between re-entry speeds approaching 18,000 miles an hour, and glide-in speeds of approximately 100 miles per hour, and still provide complete scale range between these values; (2) the inability to provide accuracy and scale range for flight conditions of a Mach 2 fighter between its top speed and its approach speed of about 150 to 175 knots. Thus, normally a multiple of adjacent display means covering segments of the range is required to achieve both large range and high quality reading.

Moreover, when quantitative values indicated on a display change in relative significance as another variable changes, conventional display apparatus simply does not reflect this factor. For example, the significance of a particular flight path angle of an aircraft varies as the function of velocity and air density, since a combination of these two variables determines the rate at which kinetic energy is converted into heat. These variables therefore markedly influence the determination of a safe flight path angle within the structural capabilities of a craft. A flight path angle approaching 26 degrees may be satisfactory near the termination of a space craft flight, while an angle of no more than 1.5 degrees may be crucial during re-entry.

As another example, the relative significance of rate-of-climb values varies as a function of flight path angle and true air speed. Consequently, at approach speeds precise rates in the range of 500 to 1,500 feet per minute are crucial, whereas at high speed extremely fast rates of climb are possible.

As still another example, overshoot and undershoot problems of a submarine approaching a desired level is presently difficult to avoid because conventional displays do not indicate the different relative significance of the depth or rise angle as the vehicle approaches the desired level. Consequently, instead of the submarine following a smooth asymtotic curve, the vehicle tends to overshoot or undershoot.

The limitations of present display apparatus, therefore, are due mainly to the incapacity of a compact display of (1) covering a large scale range, and still providing accurate indications at any point on the scale, and (2) to the lack of an indication of relative significance of indicated quantitative values of a parameter, especially as these values vary with respect to values of one or more different parameters.

It is an object of this invention to provide a compact display apparatus providing both large scale range, and also high accuracy or quality indication as needed on portions of the scale.

It is another object of this invention to provide a display apparatus capable of indicating both quantitative values of a parameter and the relative significance of these values.

It is another object of this invention to provide a variable gain display apparatus having a scale means which is expandable, at least in portions thereof, to render high quality indications, while also covering a large scale range.

It is another object of this invention to provide a display apparatus adapted to portray accurate values of a parameter varying greatly over various stages of an operation, such as a space vehicle flight.

It is another object of this invention to provide a display means having an indicator means adapted to portray not only quantitative values of a parameter, but also the relative significance of those values in response to the influence of changing values of a second parameter.

It is still a further object to provide a display apparatus having a moving indicator means responsive to the values of a first parameter, and moving scale means having an expandable scale thereon responsive to values of a second parameter which also influences said first parameter, whereby the display apparatus can readily adapt to different operational conditions.

It is still a further object to provide a variable gain display apparatus wherein the scale means is not only responsive to the changing values of a second parameter, but also causes direct compensation of the indicator means due to variations of value representation on the expandable scale means.

It is moreover an object of this invention to provide instrumentation apparatus adapted to corroborate values of at least two changing, functionally inter-related parameters and reflect both the quantitative values of one parameter, and the relative significance of these quantitative values due to influence thereon by the other parameters.

These and other objects of this invention will be apparent upon studying the following specification in conjunction with the drawings in which.

Figure 1:
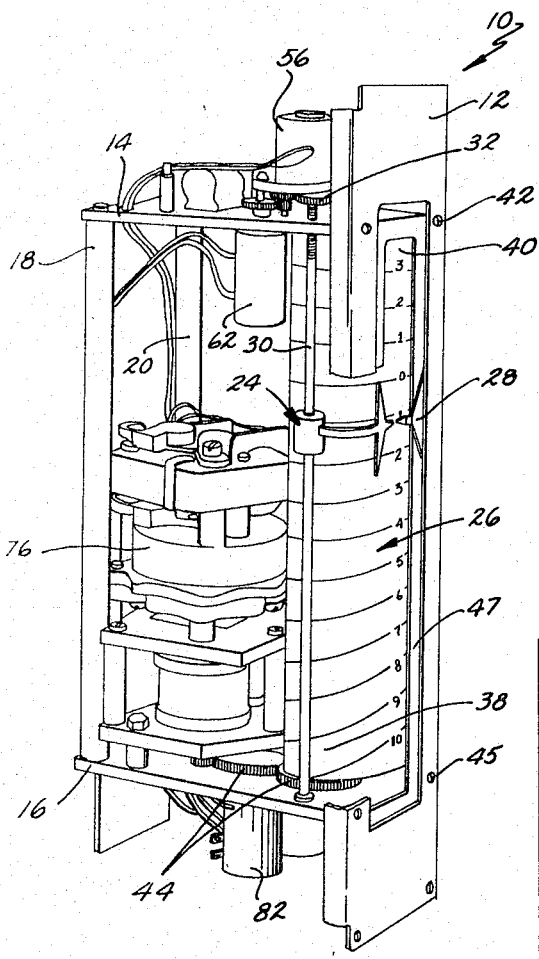
FIG. 1 is a perspective view of one embodiment of the inventive variable gain apparatus.

Basically, the invention comprises a display apparatus having movable indicator means and an expandable scale means. The indicator means of the variable gain display is responsive to changing values of a first parameter, and the scale means is responsive to changing values of a second parameter which is functionally associated with said first parameter to change the relative significance of said first parameter values. This relative significance is also indicated on the variable gain display. The expanding scale also creates a compensating response in the indicator means to compensate for expansive movement of scale markings on the scale.

Within the broadest aspects of this invention, the novel apparatus may be used to control operational conditions due to movement of an element equivalent to the indicator means, so that operation of a vehicle, for example, would be automatically controlled by mechanical or electrical sensing of the "display" instead of the display being visually observed. Thus, "display" includes the reflection of values to a mechanical or electrical sensor as well as a human observer in the broader concept of this invention.

Referring to the drawings, the inventive apparatus 10 in the form illustrated, includes an escutcheon plate 12 adapted to mount the apparatus in an instrument panel of an aircraft, space vehicle, submarine or any other apparatus with which the invention is used. In the form illustrated, the structural support is provided by a pair of spaced upper and lower mounting plates 14 and 16 attached to plate 12 by screws 42 and 45, and a pair of vertical supports 18 and 20 mounted between the rear edges of the plates.

Figure 4:
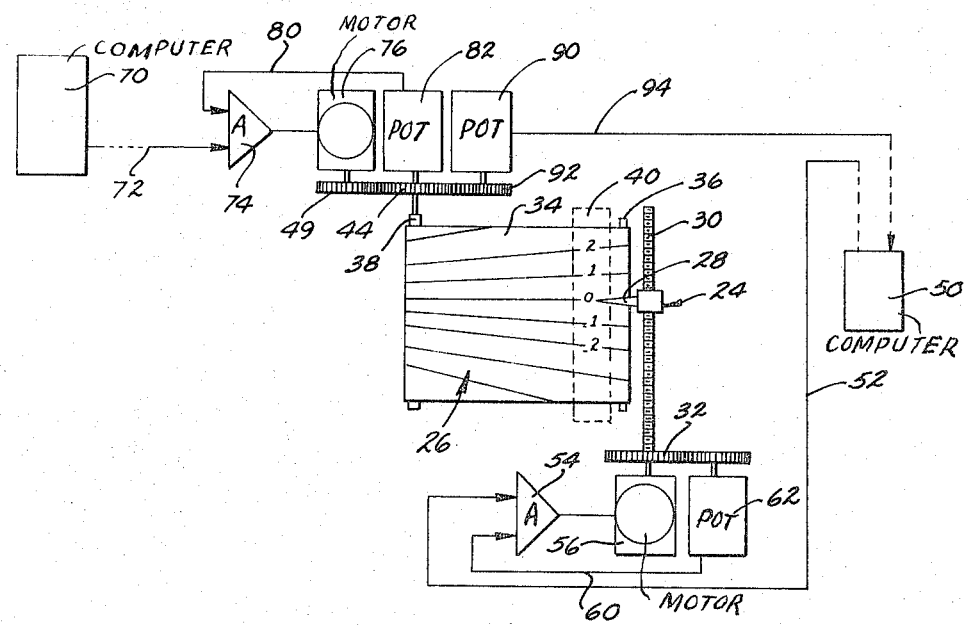
FIG. 4 is a schematic diagram of the apparatus showing representative circuitry components.

The apparatus includes two main operative portions, namely, indicator means 24 (FIG. 4) and scale means 26.

The indicator means illustrated includes pointer 28 operably mounted on screw 30 to move vertically thereon as the screw is rotated by gear 32. Scale means 26 in the form illustrated includes a flexible platform or tape 34 wound on spaced rollers 36 and 38. The tape may comprise a Teflon impregnated fiber glass material or any other suitable material. The tape moves past the viewing area 40 outlined by mask 47 behind escutcheon plate 12. Roller 38 mounted between plates 14 and 16 is adapted to be driven by gear means 44 (illustrated schematically as one gear in FIG. 4 and mechanically shown as a pair of intermeshing gears in FIG. 1). Thus, tape 34 is adapted to move crosswise or laterally of the viewing area 40 to place different portions of the scale within the visible area. Pointer 28 is adapted to move longitudinally, i.e. vertically of the viewing area 40.

For convenience, the specific embodiment of the invention illustrated is explained using vehicle flight path angle as the first parameter, and vehicle velocity as the second parameter. The velocity parameter has a direct influence on the values of the flight path angle parameter, thereby causing a specific quantitative flight path angle value to vary greatly in relative significance.

A pair of closed loop servo systems are employed to sense and transmit signals representing values of these parameters. One controls the indicator means, and the other controls the scale means.

Flight path angle information is sensed by a suitable flight path angle computer 50 which sends an electrical voltage signal through lead 52, and through amplifier 54, to electrical motor 56 which rotates gear 32. Thus, any change in flight path angle is reflected by pointer 28 due to rotation of gear 32 and screw 30. The pointer thus moves upwardly or downwardly on the scale. A conventional error feedback circuit 60 with an automatic follow-up 62 (which may be a potentiometer for example) is preferably used. Thus, it will be seen that indicator means 24 is responsive to changing values of the first parameter, here represented as the flight path angle.

Velocity input values to the scale means 26 are sensed by a suitable data computer 70, which likewise emits an electrical voltage signal through lead 72, through amplifier 74, to electrical motor 76. Motor 76 drives gear means 49, and thus gear means 44 which rotates roller 38. Here again, an error feedback circuit 80 through a follow-up potentiometer 82 may be employed. A voltage signal sent from computer 70 due to a variation in the velocity of the vehicle is therefore amplified and utilized to rotate shaft 38 and thereby wind or unwind the tape 34 thereon. A suitable helical spring (not shown) or its equivalent is embodied in roller 36 to maintain the tape in a constant tight condition. Of course, the particular electrical components and computer input components may be varied widely according to the application of the apparatus.

Figure 2:
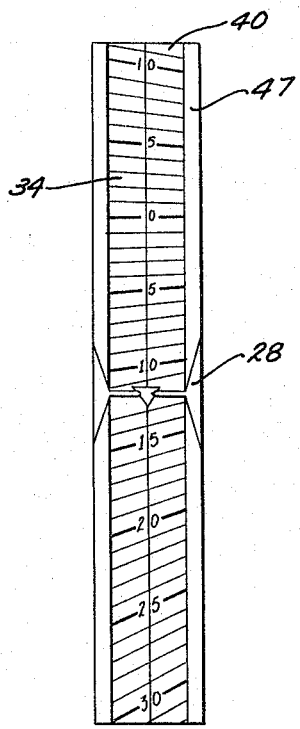
FIG. 2 is a front elevational view of a portion of a representative scale and indicator means at one stage of the operation.
Figure 3:
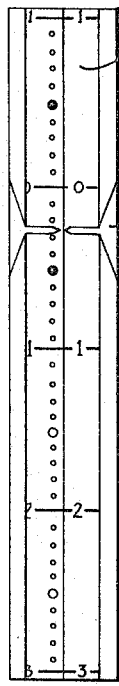
FIG. 3 is a front elevational view of a second portion of the scale shown in FIG. 2, and the pointer means shown in FIG. 2, during another stage of the operation.

As stated, winding or unwinding of the tape on the respective spools or rollers 36 and 38 places different portions of the tape within the viewing area 40. The tape or other platform means is provided with scale markings expandable over different portions of the scale. I.e., scale markings and identifying numerals (2, 1, 0, −1 and −2, etc.) representing quantitative values of the first parameter have variable spacings from one another at different sections of the tape. Thus, with the radiating scale markings or lines as shown, scale range would be larger that the left end of the tape, while quality or accuracy of the indication would be greater in the expanded portions at the right end of the tape scale. By using a tape such as that shown, a scale range of 10 to 1, 20 to 1 or even much greater can be achieved. A tremendously large range is therefore available, while still enabling extremely accurate readings at particular portions of the scale during different stages of an operation. This variation in range and quality with scale expansion is more readily appreciated by a comparison of FIGS. 2 and 3 showing different portions of tape 34. Both figures represent scales for values of flight path angle. The portion of the tape illustrated in FIG. 2 is closer to the left end of the tape 34 and depicts a relatively larger range than the portion illustrated in FIG. 3, with the latter being an expanded portion closer to the right end of the scale. In the scale shown, the zero indication maintains a constant vertical, i.e. longitudinal, position in the viewing area as the tape moves to left or to the right. Thus, the spacing of pointer means 28 with respect to the zero scale marking in general carries with it the same, or nearly the same, qualitative value. The scale illustrated in FIGS. 2 and 3 representing flight path angle is also representative of a rate-of-climb scale of an aircraft or space vehicle, or a dive and climb angle scale for a submarine, and other similar changes of altitude, latitude or the like.

It will be realized that if the tape represents quantitative velocity or altitude values, or other parameters not varying back and forth across zero, the scale markings will likewise not center around a stable zero point.

It has been found that the inventive variable gain displays are most appropriate where the relative values of the parameter expressed vary as a function of some other independent variable or variables, and where the qualitative values of an indication varies inversely as the instantaneously displayed quantitative range.

Since the scale is expandable, compensation means is provded for the pointer movement in response to scale movement, i.e. as the tape 34 moves to the left or to the right, the position of pointer 28 would wander with respect to particular scale values on the tape if no compensation were made. This would introduce error. For example, assume the first parameter and the pointer do not vary in a chosen interval of time. However, if the second parameter did vary to thereby move the scale, the line representing the positive quantitative value of 1 would appear to move upwardly or downwardly away from pointer 28. The pointer would then be indicating a different value for the first parameter, when in fact the parameter had not varied. Therefore, compensating movement of the pointer in an amount corresponding to the tape change must be made to move pointer 28 vertically to follow the scale marking. Thus, if the value of the first parameter, i.e. flight path angle, remains constant at 1 degree, for example, pointer 28 will constantly point at the line represented by 1 and will move vertically up or down to follow this line. This compensation can be achieved by a compensator 90, such as a potentiometer, having a gear 92 driven by gear means 44. When gear 92 is rotated, potentiometer 90 emits a voltage signal through lead 94 to flight path angle computer 50. If the flight path angle at that particular time is constant, the compensating voltage signal then travels through lead 52 and amplifier 54 to rotate electrical motor 56, gear 32, and screw 30 to move pointer 28 a compensating amount. Of course, the compensation movement must be calibrated to accommodate the configuration and spacing of the scale markings or lines, as well as other factors involved in a particular situation. If the flight path angle varies simultaneously with the velocity variation, i.e. the value of the first parameter is changing simultaneously with the value of the second parameter, the compensating voltage signal sent from potentiometer 90 through lead 94 will be added algebraically to the voltage signal originating at computer 50. The algebraic sum of the two voltage signals will then pass through amplifier 54 to motor 56 to provide compensating movement to indicator means 24.

The particular type of scale means 26 chosen for any application of the variable gain display may vary widely. Conceivably, the scale markings could be expanded by actual physical expansion or extension of the scale means. Alternatively, optical means could be used to magnify the scale markings to provide the "expandable" scale. Other possibilities may occur to those in the field within the principles taught. The essential features are the expandable nature of the scale over different sectors thereof, and its movable nature to place these different sectors within a viewing area for cooperation with a movable indicator means. The scale means is preferably responsive to one or more parameters which directly influence the parameter to be indicated, as described above. It should be realized that although only one parameter is shown feeding into the scale means mover, any number of parameters may influence scale movement in any proportionate relationship desired. Moreover, the variable gain display could designate velocity, flight path angle, or any other parameter desired. It need not even be used on vehicles, although this use is of the most concern at present.

Alternatively, the scale may be manually moved by the observer to place different sectors of the scale within the viewing area as the vehicle passes through various phases of an operation. For example, in an orbital flight, different sectors of the scale representing take-off, orbiting, re-entering and glide-in phases of the operation could be successively moved into operative association with the indicator means by the observer.

The lines on the scale may moreover be many different configurations other than straight radiating lines like those shown. This will vary with the characteristics of the parameters involved. For example, gradually curving markings, asymtotically curved lines, etc. could be used. Of course, the compensation for the indicator means must be graduated accordingly, to prevent wander error when the scale is changing.

In the form of the invention illustrated, the steepness of the angle of the radiating scale markings with respect to pointer 28 also enables the observer of the scale to determine which part of the scale is in the viewing area. Thus, the scale not only indicates quantitative values and relative significance of the values with respect to other factors or parameters, but also indicates the stage of operation by the slope of the scale markings. It further enables the scale to be expanded in crucial portions to increase the quality, or compressed in other portions to increase the scale range, while still maintaining a compact instrument as stated hereinbefore.

When the variable gain display is adapted to parameters such as altitude and velocity where the spacing of the pointer from zero value is not available to indicate relative significance of a particular quantitative value with respect to other parameters, it may be desirable to have the display means respond in additional ways to indicate maximum limits. For example, a variable-color lighting means in the display or in the pointer could indicate the relative significance of velocity with respect to flight path angle to prevent a pilot from exceeding structural limitations of the craft. Thus, the pointer could change from blue to yellow to red as crucial maximum parameter values are approached.

The display is primarily intended for visual observance by a person. However, the principles taught herein may also be readily utilized to cause the apparatus to activate a mechanical sensor or electrical sensor in the place of a human observer, to thus enable automatic control of a vehicle or other apparatus.

It will be readily realized by those in the art that the unique variable gain principles taught herein have tremendous potential, and that the form of the invention illustrated is merely representative of the multitude of variations in particular physical apparatuses and electrical circuitry embodying the invention. Thus, obvious modifications within the scope of the inventive principles are deemed part of this invention, which is to be limted only by the scope of the appended claim and the reasonably equivalent structure and methods to those defined therein.

We claim:

Instrumentation apparatus comprising: pointer means and scale means; said pointer means adapted to move over said scale means; said pointer means being driven by potentiometer means responsive to voltage signals created with changing values of a first parameter; said scale means adapted to move with respect to said pointer means to shift different portions of said scale into operative association with said pointer means; said scale means being driven by potentiometer means responsive to voltage signals created with changing values of a second parameter having an influence on the relative significance of values of said first parameter; said different scale portions having value representations thereon expanded to varying amounts; and electrical connection means between said potentiometer means for said scale means and said potentiometer means for said pointer means, causing feeding of said scale means voltage signals to the potentiometer means of said pointer means to supplement said pointer means voltage signals, thereby causing proportional pointer movement to compensate for the expansion of scale value representations.

References Cited by the Examiner

UNITED STATES PATENTS

| | | | |
|---|---|---|---|
| 2,101,296 | 12/1937 | Simpson | 324—115 |
| 2,620,256 | 12/1952 | Kerns et al. | 346—112 |
| 2,649,715 | 8/1953 | Goble | 324—115 |
| 2,964,702 | 12/1960 | Lamberty | 324—58 |

WALTER L. CARLSON, *Primary Examiner.*

FREDERICK M. STRADER, *Examiner.*

D. R. GREENE, J. J. MULROONEY,
*Assistant Examiners.*